United States Patent [19]

Merving

[11] Patent Number: 5,408,781
[45] Date of Patent: Apr. 25, 1995

[54] CAPSULE WITH ISOLATED CHEMICAL AGENT CONTAINING CAVITIES

[76] Inventor: Hans A. K. Merving, August Stalbergsvag 10A, 644 00 Torshälla, Sweden

[21] Appl. No.: 150,736

[22] Filed: Nov. 12, 1993

Related U.S. Application Data

[63] Continuation-in-part of Ser. No. 29,428, Mar. 9, 1993, which is a continuation-in-part of Ser. No. 555,734, Jul. 23, 1990, Pat. No. 5,207,021, which is a continuation-in-part of Ser. No. 410,884, Sep. 22, 1989, Pat. No. 5,010,684, which is a continuation-in-part of Ser. No. 393,841, Aug. 7, 1989, Pat. No. 4,905,410, which is a continuation of Ser. No. 184,072, Apr. 20, 1988, abandoned.

[51] Int. Cl.⁶ .............................................. A01G 29/00
[52] U.S. Cl. .................................................... 47/57.5
[58] Field of Search .......................................... 47/57.5

[56] References Cited

U.S. PATENT DOCUMENTS

| | | |
|---|---|---|
| 1,999,458 | 4/1935 | Hollister . |
| 2,970,404 | 2/1961 | Beaufils et al. . |
| 3,706,161 | 12/1972 | Jenson . |
| 3,864,874 | 2/1975 | Norris et al. .......................... 47/57.5 |
| 4,308,689 | 1/1982 | Jenson et al. . |
| 4,342,176 | 8/1982 | Wolfe . |
| 4,344,250 | 8/1982 | Fahlstrom . |
| 4,905,410 | 3/1990 | Merving . |
| 5,114,032 | 5/1992 | Laidlaw .................................. 47/57.5 |

Primary Examiner—Ramon S. Britts
Assistant Examiner—Joanne C. Downs
Attorney, Agent, or Firm—Keck, Mahin & Cate

[57] ABSTRACT

A capsule for insertion into a bore includes a plastic container having a shank portion with one internal cavity having at least one end opening. The one internal cavity contains one chemical agent. A head element is integrally formed with the shank portion. A plastic plug sealingly closes the internal cavity. The plug is insertable into an end opening of the one internal cavity so as to provide a tight fit between the plug and the end opening. Another internal cavity is defined so as to be isolated from the one internal cavity. The other internal cavity contains another chemical agent. The shank portion has a plurality of recessed slots which are formed in the exterior surface thereof at circumferentially equal spacings. The slots extend longitudinally along a central part of the shank portion between the end opening and the head element and allow the shank portion to be broken so that as an impact force applied to the head element moves the head element towards the plastic plug, the plastic plug expands the central part of the shank portion and breaks the shank portion along the recessed slots into a plurality of strips to form passages between the strips. The chemical agents then pass from the one internal cavity and the other internal cavity through the passages.

10 Claims, 3 Drawing Sheets

5,408,781

CAPSULE WITH ISOLATED CHEMICAL AGENT CONTAINING CAVITIES

This application is a Continuation-in-Part of U.S. patent application Ser No. 08/029,428, filed Mar. 9, 1993, which is a Continuation-in-Part of U.S. patent application Ser. No. 07/555,734, filed Jul. 23, 1990, now U.S. 5,207,021 which is a Continuation-in-Part of U.S. patent application Ser. Pat. No. 07/410,884, filed Sep. 22, 1989, now U.S. Pat. No. 5,010,684, which is a Continuation-in-Part of U.S. patent application Ser. No. 07/393,841, filed Aug. 7, 1989, now U.S. Pat. No. 4,905,410, which in turn is a Continuation of U.S. patent application Ser. No. 07/184,072, filed Apr. 20, 1988, now abandoned.

BACKGROUND OF THE INVENTION

The present invention relates to a capsule for treating wooden items, trees or a variety of porous structures. The invention is particularly useful for feeding at least one chemical agent into plants and, more particularly, for delivering a chemical agent or chemical agents to the phloem layer of a tree. The chemical agent or agents may be a herbicide or herbicides, or any other tree destroying agent or agents, if the treatment is designed to kill the tree, or fertilizers, fungicides or other medicants or nutrients in various combinations if the treatment is designed to cure the tree from diseases or nutrient deficiencies.

Capsules consisting of generally cylindrical hollow containers and plugs for insertion into predrilled holes in an item or structure to be treated are known. Such capsules have typically been made of a frangible material, or of a hard, brittle, breakable and non-elastic material, such as fiberglass, wood or wood fiber. However, the hollow containers of these known capsules tend to be breakable before they are assembled or even after assembly upon inadvertent application of an external impact. Also the containers of these known capsules are typically used to apply only a single chemical agent to the item or structure.

SUMMARY OF THE INVENTION

It is, therefore, an object of the present invention to provide a capsule which is difficult to accidentally break before usage and yet which is easily breakable when an axial impact force is applied.

It is also an object of the present invention to provide a capsule which releases more than one treating chemical agent into the item or structure which is being treated and to provide an improved connection between capsule parts.

In one application of the present invention, a tree treatment capsule for insertion into a bore in a tree is provided. The capsule includes a plastic container having a shank portion with one internal cavity having at least one end opening. The one internal cavity contains one chemical agent. A head element is integrally formed with the shank portion and a plastic plug is used for closing and sealing the one internal cavity. The plastic plug has an outer external diameter which is slightly smaller than an end opening of the one internal cavity.

The plug is insertable into the one end opening so as to provide a tight fit between the plug and the end opening. Another internal cavity, which is isolated from the one internal cavity, is also provided. The other internal cavity contains another chemical agent.

The shank portion has a plurality of recessed slots formed in the exterior surface thereof at circumferentially equal spacings. The slots extend longitudinally along a central part of the shank portion between the end opening and the head element and allow the shank portion to be broken so that an impact force, applied to the head element, moves the head element towards the plastic plug. The plastic plug expands the central part of the shank portion and breaks the shank portion along the recessed slots into a plurality of strips to form passages between the strips, thereby allowing the chemical agents to pass from the one internal cavity and the other internal cavity through the passages. The capsule may further include a cap closing an open end of the plug, and the other internal cavity may be defined by a cylindrical portion of the plug, the cap and a thin membrane forming a closed end of the plug. Alternatively, the other internal cavity may be defined by a thin membrane extending within the shank portion and a cap received in an opening formed in the head element.

DESCRIPTION OF THE PREFERRED EMBODIMENTS

Figure 1:
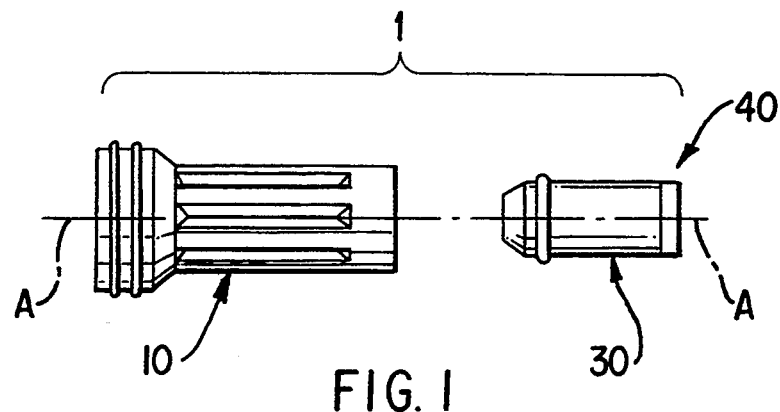
FIG. 1 is an exploded side view of a tree treatment capsule in accordance with one preferred embodiment of the present invention.

Referring now to the drawing figures illustrating the first embodiment of the invention and, in particular, to FIG. 1, the present invention is embodied as a tree treatment capsule adapted for insertion into a predrilled bore in the trunk of a tree to be treated. As noted previously, the present invention could also be used to treat items, other than trees, which are made of wood or other porous materials. The capsule 1 comprises a generally cylindrical plastic container 10, a generally cylindrical, hollow plastic plug 30 and a generally cylindrical hollow plastic cap 40. Container 10, plug 30 and cap 40 are initially formed separate from each other, but when capsule i is assembled, container 10, plug 30 and cap 40 are secured together and share a common longitudinal axis A.

Figure 2:
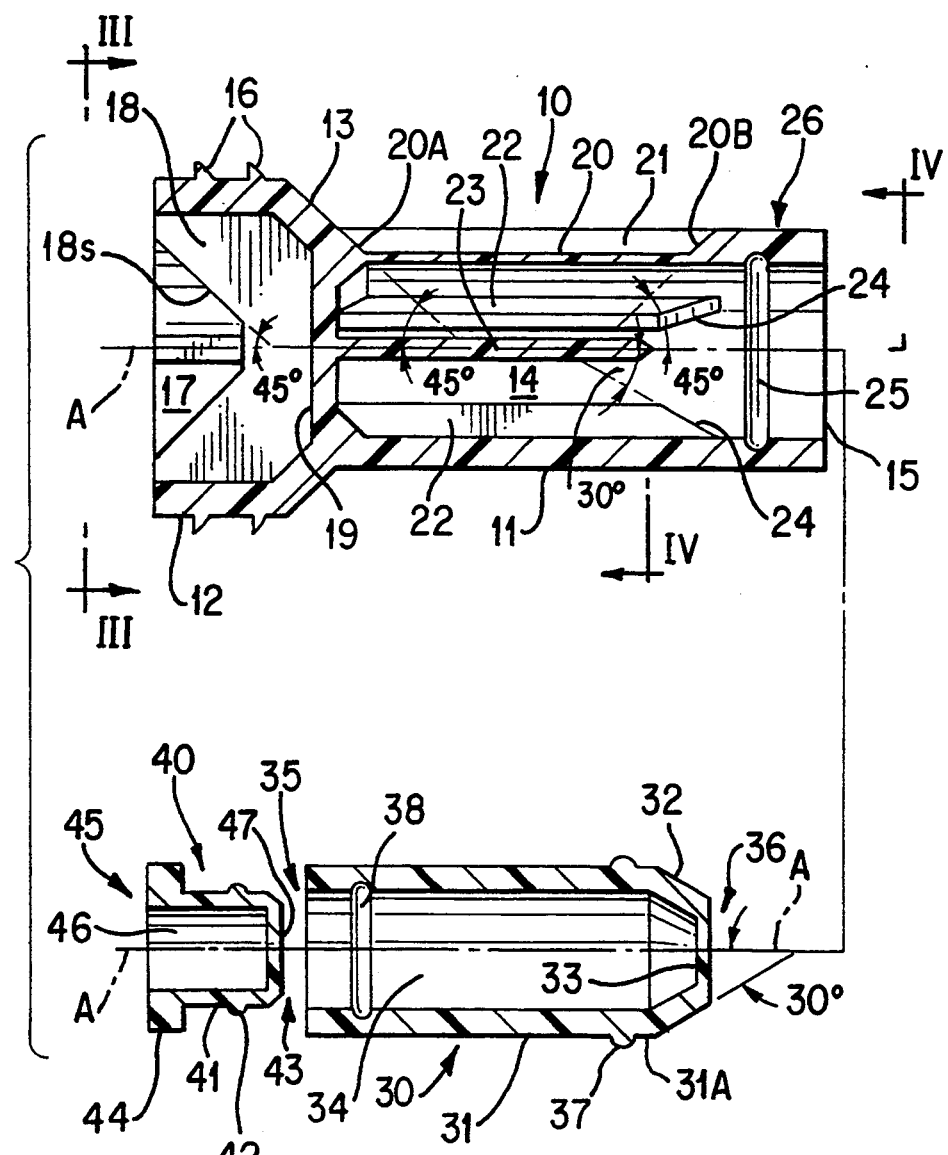
FIG. 2 is an exploded side sectional view of the tree treatment capsule of FIG. 1.
Figure 3:
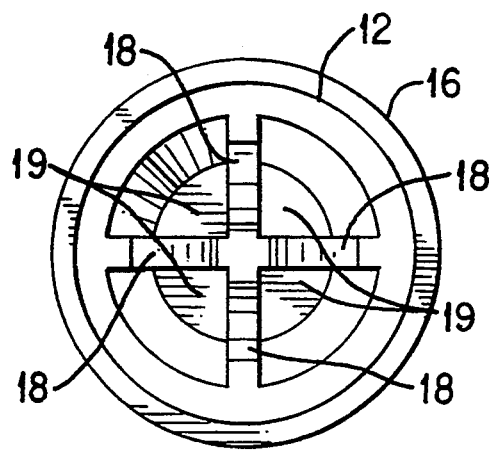
FIG. 3 is an end view of the capsule of FIG. 2 as it appears when viewed in the direction of arrow III.
Figure 4:
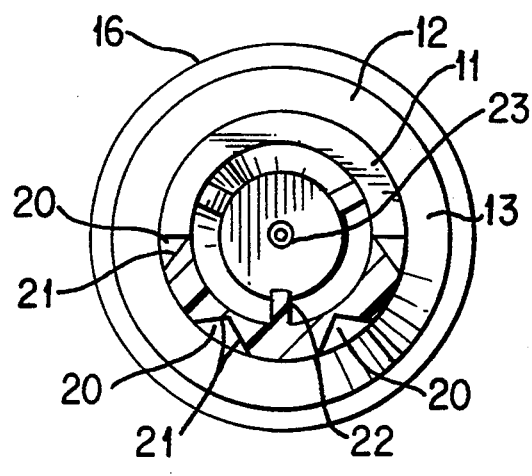
FIG. 4 is an end view, partly in section, of the capsule of FIG. 2 as seen along section line IV—IV.

Referring now to FIGS. 2–4, it may be seen that the cylindrical container 10 includes a cylindrical, hollow shank portion 11 having a cylindrical, hollow head element 12 rigidly joined thereto by a conically tapered, solid transition portion 13. The head element 12 has an outer diameter larger than an outer diameter of the shank portion 11. Circumferentially extending protrusions 16 are disposed on the outside of hollow head 12. As will become clear, the protrusions 16 serve to help retain the capsule in the bore formed in the tree trunk once the capsule has been inserted in the bore.

The shank portion 11 is formed as a circumferential wall having radially inner and outer surfaces. Shank portion 11 encircles an internal cavity 14 and has a first, open end 15 defining an end opening to the cavity, into which a first tree treating chemical agent (not shown) is placed. The head element 12 also forms an open ended internal cavity 17, in which ribs 18 are integrally formed with the head element 12. Ribs 18 extend crosswise in cavity 17 in order to provide a lightweight and yet strongly reinforced structure to the hollow head element 12. As is apparent from FIG. 2, the axially outer surface 18 of each rib 18 is angled at about 45° relative to longitudinal axis A. Internal cavities 14 and 17 are separated by a partition 19. Partition 19 thus closes a second end of the shank portion opposite the first, open end 15. The partition 19 has a pointed spear or rod 23, integrally formed therewith, extending normally relative to the partition 19 and, as illustrated, along the axis A of the capsule 1.

The shank portion 11 has a series of, for example six, equally circumferentially spaced, recessed slots 20 formed in the exterior, radially outer surface thereof. These recessed slots 20 longitudinally extend along the shank portion 11 from the junction between transition portion 13 and head element 12 towards open end 15 of the shank portion. As illustrated, recessed slots 20 extend longitudinally along the exterior of shank portion 11 over approximately 80% of the length of the shank portion. As is apparent from FIG. 4, each of the recessed slots is formed by a pair of side walls 21 which diverge from each other at an angle of approximately 90°. Additionally, longitudinally opposite ends 20A and 20B of each slot 20 are each angled at approximately 45° relative to the longitudinal axis A. Recessed slots 20 are sufficiently deep so as to make the shank portion easily breakable along the slots, as will be described.

Shank portion 11 is additionally provided with a plurality of ribs 22. As is apparent from FIGS. 2 and 4 of the drawings, ribs 22 are integrally formed with the rest of the shank portion 11 and extend radially inwardly into cavity 14 from the inner surface of the shank portion. Each rib extends longitudinally along the radially inner surface of shank portion 11 so as to be substantially coextensive with, or equal in length to, recessed slots 20. Referring to FIG. 4, it can be seen that each rib 22 is provided at a circumferential location which is midway between adjacent recessed slots 20. It should be noted, however, that it is not necessary to provide a rib 22 midway between every pair of adjacent recessed slots 20. As illustrated, three ribs 22 are provided on the radially inner surface of the shank portion at 120° intervals, and at locations between every other pair of adjacent slots 20. Each rib 22 is also provided with an inclined end surface 24 which is oriented at approximately 30° relative to the longitudinal central axis A of the capsule 1. The shank portion 11 additionally includes a circumferential recess 25 provided in the radially inner surface of shank portion 11 at a location which, in the direction of longitudinal axis A of capsule 1, is intermediate the ends of slots 20 and ribs 22 and the first, open end 15 of shank portion 11. This location, which is generally designated by reference number 26 in FIG. 2, is substantially more rigid than the remainder of the portion 11, due to the absence in the location of slots 20.

Referring back to FIG. 2, it is apparent that the plug 30 is formed with an internal cavity 34. A first open end of the plug 30, generally designated 35, and a second, closed end of the plug, generally designated 36, are provided. The plug 30 includes a cylindrical portion 31 and a tapered or inclined portion 32. As illustrated, portion 32 is substantially conical. The second, closed end 36 includes a thin membrane 33 which truncates the tapered or inclined portion 32. The cylindrical portion 31 has nearly the same outer diameter as the inner diameter of the shank portion 11 so that end part 31A of the cylindrical portion 31 is snugly received within cavity 14 when the capsule 1 is fully assembled. The cylindrical portion 31 is integrally connected at one longitudinal end to the conical portion 32. At a second longitudinal end, the cylindrical portion 31 is provided with a circumferential recess 38 provided in its radially inner surface.

Conical portion 32 of plug 30 has an outer surface which is angled, relative to central axis A, at approximately 30°. The outer surface of conical portion 32, therefore, has the same angle relative to longitudinal axis A as end surfaces 24 of ribs 22. Conical portion 32, consequently, may either tightly engage or be slightly spaced from inclined end surfaces 24 of ribs 22 when the capsule 1 is fully assembled. A circumferentially protruding ridge 37 is provided on the outer surface of cylindrical portion 31 at a location adjacent the first longitudinal end of the plug. As will become clear, when capsule 1 is assembled, ridge 37 of plug 30 interlocks with recess 25 in the radially inner surface of shank portion 11 to secure plug 30 in open end 15 of the shank portion. In the embodiment illustrated in FIGS. 1-6, the cooperating inclined surfaces 24 of the ribs 22 and of the conical portion 32 of plug 30 are shown as being straight; however, surface 24 and portion 32 could be curved if desired.

The cap 40 includes a cylindrical portion 41. A circumferentially protruding ridge 42 is provided near a first end 43 of the cap 40 and on an outer surface of the cylindrical portion 41. An annular flange 44, projecting radially outwardly from the cylindrical portion 41, is disposed at a second end 45 of the cap. The cylindrical portion 41 includes a central cavity 46 formed therein in order to reduce the amount of material needed to make the cap 40. The first end 43 of the cap, however, is closed off by an end wall 47.

The cylindrical portion 41 of the cap 40 has nearly the same outer diameter as the inner diameter of the cylindrical portion 31 of the plug 30 so that the cylindrical portion 41 is snugly received within the cavity 34 when the capsule 1 is fully assembled. When the capsule 1 is assembled, ridge 42 of the cap 40 interlocks with recess 38 in the radially inner surface of portion 31 to secure the cap 40 in the open end 35 of the plug 30. The annular flange 44 abuts the longitudinal end surface of the cylindrical portion 31 when ridge 42 interlocks with recess 38.

All portions of the capsule 1 are made of brittle plastic materials by, for example, injection molding or extrusion molding. It is specifically preferred to make the container 10 of polystyrene or polycarbonate and the plug 30 and the cap 40 of polyethylene. Making the container 10 of a different plastic material than that of the plug 30 and cap 40 enables the container 10 to be broken more easily than plug 30 and cap 40.

In assembling the capsule 1, a first chemical agent is introduced into the cavity 14 of the container 10 and the plug 30 is inserted into open end 15 of the container 10. Plug 30 is forced into the open end until ridge 33 snaps into engagement and is completely received in recess 25. The end part 31A of cylindrical portion 31 tightly fits in the open end 15 and the inclined, conical portion 32 either engages or is disposed adjacent to the inclined end surfaces 24 of ribs 22. Ridge 37 is completely received in and tightly engaged with recess 25 to completely seal off the open end 15 of container 10. An improved connection between capsule parts, i.e., container 10 and plug 30, is, therefore, provided. Although a tight fit is obtained between the plug 30 and the container 10 due to the interengagement of ridge 37 and recess 25, it is possible to additionally apply an adhesive at the junction between plug 30 and container 10 to further secure the end part of cylindrical portion 31 in the open end 15 in order to provide a superior seal.

The first chemical agent may be of any kind of, for example, a herbicide or a fungicide, and in any form of, for example, a tablet, a powder, a jelly-like material, a pasty material, or a liquid.

A second chemical agent is introduced into the internal cavity 34 of the plug 30. This second chemical agent could be identical to the first chemical agent or may be one which mixes and reacts with the first chemical agent in some desired way. The cap 40 is then forced into the open end 35 until ridge 42 snaps into engagement and is completely received in recess 38. Once the ridge 42 is received in recess 38, the cavity 34 is sealed off from the outside environment by both the end wall 47 and the corporation between ridge 42 and 38. An adhesive may be used in order to enhance the seal between the cap 40 and the plug 30.

Figure 5:
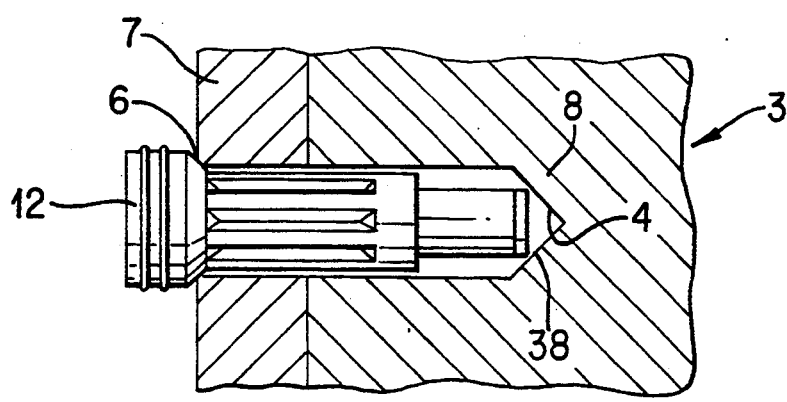
FIG. 5 is a longitudinal plan view of an assembled tree treatment capsule of FIG. 1 shown in a first stage of insertion in a bore in a tree.
Figure 6:
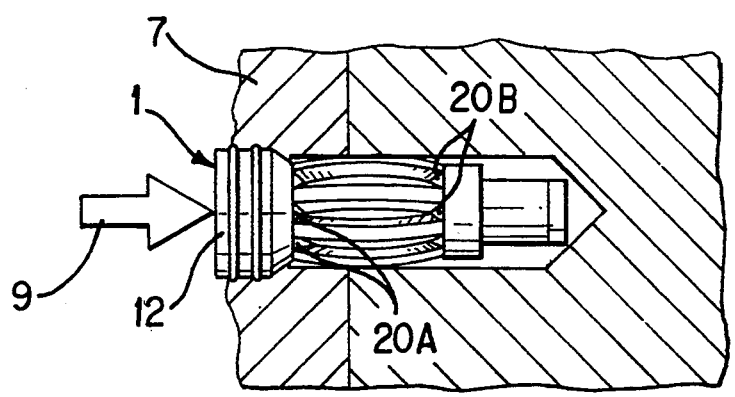
FIG. 6 is a longitudinal plan view of an assembled tree treatment capsule of FIG. 1 shown in a second stage of insertion in a bore in a tree.

The assembled chemical agent containing capsule 1 is inserted into a pre-drilled bore 4 in the trunk of a tree 3 to be treated. As is seen in FIGS. 5 and 6, the bore 4 is dimensioned to extend through the bark 7 and into the phloem layer 8 of the tree 3. The bore 4 is further dimensioned to have an internal diameter between the external diameters of the shank portion 11 and head element 12, respectively, and a depth slightly greater than the combined lengths of the shank portion 11, the plug 30 and the flange 44 when the capsule 1 is assembled. The capsule 1 is inserted into the bore 4 of the tree 3 until the flange 44 of the cap 40 abuts against a wall, for instance the bottom wall of the bore 4, as is shown in FIG. 4. This brings the tapered transitional portion 13 of the container 10 into contact with the circumferential edge 6 of the bore 4.

Impact force is applied to the head element 12 by, for example, hammering, in the direction shown by arrow 9, causing the head element 12 and the shank portion 11 of the container 10 to move toward the cap 40 such that the conical or otherwise inclined portion 32 slides along inclined end surfaces 24 of ribs 22. The inclined portion 32 of plug 30 acts as a cam and forces the ribs 22 to expand the central part of shank portion 11 radially outward and break the shank portion 11 along the slots 20 into strips 20A, as is shown in FIG. 6. At the same time, the pointed spear or rod 23 pierces and penetrates the thin membrane 33 to provide communication between cavity 14 and cavity 34. This permits the first and second chemical agents to mix together and react. The strips 20A form passages 20B therebetween to permit the chemical agents, if they are in a jelly-like or liquid form, to be released and mix with the sap of the tree 3, or to permit the sap of the tree 3, if at least one of the chemical agents is in the form of a tablet or a powder, to permeate and mix with the chemical agent. Because passages 20B are located in the central part of shank portion 11, they are aligned with the phloem layer of tree 3. The chemicals contained in the capsule 1 are, therefore, precisely released into this phloem layer.

Since the outer diameter of the head element 12 of the capsule 1 is larger than the inner diameter 6 of the originally pre-drilled bore 4, a very tight fit will be obtained between the head element 12 of the capsule 1 and the opening of the bore of the tree 3 after the impact force has been applied. This causes the capsule 1 to be held very firmly in the tree 3. The central parts of strips 20A formed from the shank portion 11 will also be pressed against the internal surface of the bore 4 and be frictionally engaged with the internal surface, so as to contribute to retention of the capsule 1 firmly in the bore 4 of the tree 3. As noted previously, the protrusions 16 additionally help to retain the capsule 1 in the bore 4 by wedging into the layer of bark 7.

Figure 7:
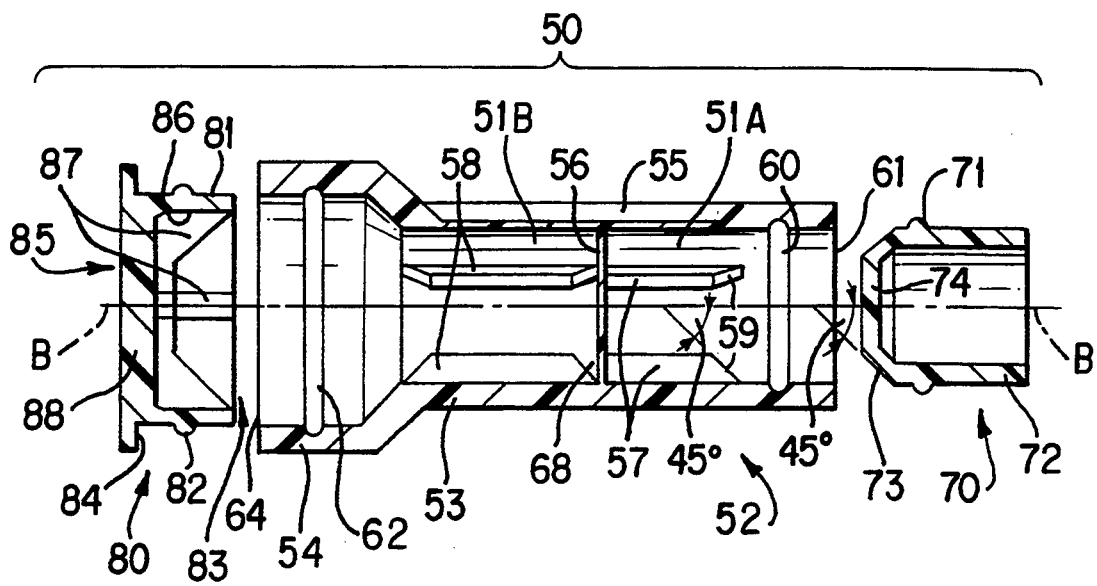
FIG. 7 is an exploded side sectional view of a tree treatment capsule in accordance with another preferred embodiment of the present invention.

FIGS. 7 and 9 show a second embodiment of the present invention. Many features of the second embodiment are the same as features of the first embodiment and, therefore, descriptions of these features are omitted. In this embodiment, a capsule 50 comprises a generally cylindrical plastic container 52, a generally cylindrical hollow plastic plug 70 and a generally cylindrical plastic cap 80. When the capsule 50 is assembled, container 52, plug 70 and cap 80 are secured together and share a common longitudinal axis B.

The cylindrical container 52 includes a cylindrical, hollow shank portion 53 having a cylindrical hollow head element 54 rigidly joined thereto in the same manner as the head element 12 is joined to the shank portion 11 in the first embodiment. The shank portion 53 has a series of equally circumferentially spaced, recessed slots 55 formed in its exterior, radially outer surface. The recessed slots 55 have configurations which are identical to the recessed slots 20 of the first embodiment.

The shank portion 53 includes a thin membrane 56 extending radially within and completely across the cylindrical space defined in the cylindrical hollow shank portion 53. The thin membrane 56 is integrally formed with the wall of the container 52 forming the shank portion 53 and divides the interior of the shank portion 53 into first and second cavities 51A and 51B. The shank portion 53 is also provided with a first plurality of ribs 57 and a second plurality of ribs 58. As is apparent from Figures 7 and 8 of the drawings, the first and second pluralities of ribs 57 and 58 are integrally formed with the rest of the shank portion 53. The first plurality of ribs 57 extends from the inner surface of the shank portion 53 radially inwardly into cavity 51A while the second plurality of ribs 58 extends radially inwardly into cavity 51B from the same inner surface.

As illustrated, three ribs 57 and three ribs 58 are provided on the radially inner surface of the shank portion 53 at 120° intervals and at locations between every other pair of adjacent recessed slots 55. Ribs 57 are all provided with inclined front end surfaces 59 oriented at approximately 45° relative to the longitudinal central axis B. The radially outermost portion of the membrane 56 is received in notches 68 longitudinally separating the first plurality of ribs 57 from the second plurality of ribs 58. The shank portion 53 additionally includes a circumferential recess 60 provided in the radially inner surface of the shank portion at a location which, in the direction of longitudinal axis B of capsule 50, is intermediate the ends of slots 55 and ribs 57 and the end opening 61 of cavity 51A. The cylindrical hollow head element 54 also includes a circumferential recess 62 provided in its radially inner surface between the location at which the head element 54 is joined to shank portion 53 and the end opening 64 of cavity 51B.

The plug 70 is adapted to be received within the end 61 of cavity 51A when the capsule 50 is assembled. A circumferentially protruding ridge 71 is provided on the outer surface of a cylindrical portion 72 of the plug. The plug 70 is further formed with a tapered or inclined portion 73 and an end wall 74. The portion 73 has the same angular inclination relative to axis B as the inclined front end surfaces 59 of the ribs 57.

Figure 8:
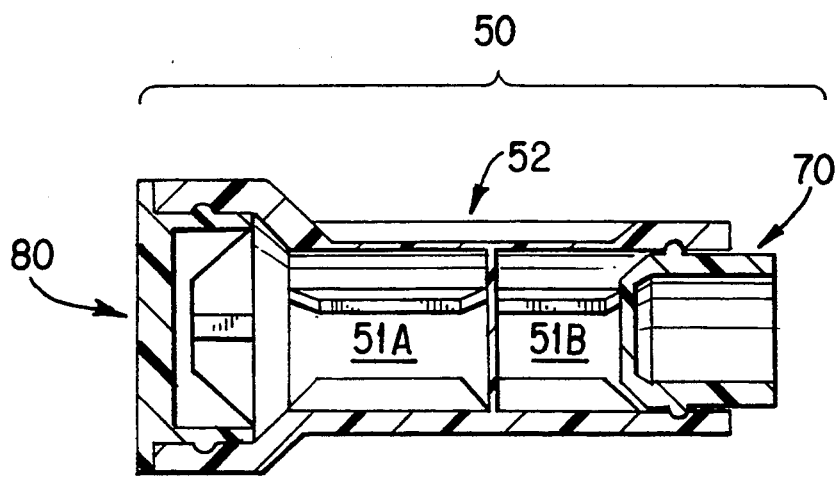
FIG. 8 is a side sectional view of the capsule shown in FIG. 7 when it is fully assembled.

When the capsule 50 is assembled, the end part of the plug 70 tightly fits in the end 61 of the cavity 51A and the portion 73 is disposed adjacent to the inclined front end surfaces of the ribs 57. Ridge 71 is completely received in and tightly engaged with recess 60 to close off the end opening 61 as shown in FIG. 8.

The plastic cap 80 includes a cylindrical portion 81. A circumferentially protruding ridge 82 is provided near a first end 83 of the cap 80 and an outer surface of the cylindrical portion 81. An annular flange 84, projecting radially outwardly from the cylindrical portion 81, is disposed at a second end 85 of the cap 80. The cylindrical portion 81 includes a central cavity 86 formed therein in order to reduce the amount of material required to make the cap, but includes ribs 87, integrally formed with the portion 81, which perform the same function as ribs 18 of the first embodiment, namely, to provide a light weight and yet strongly reinforced structure. As is clear from Figure 8, when the capsule 50 is fully assembled, ridge 82 is received in recess 62 and flange 84 abuts the end of head element 54. A solid end wall 88 of the cap 80, therefore, closes off the end 64 of cavity 51B. The two cavities 51A and 51B are both completely isolated from each other, by the presence of the membrane 56, and completely sealed off from the environment once the capsule 50 is fully assembled. As in the previously described embodiment, an adhesive may additionally be used to promote the seals between container 52, plug 70 and cap 80.

In use, when an impact force is applied to the cap 80 by, for example, hammering, the cap 80 and container 52 are moved toward the plug 70 such that the inclined portion 73 slides along the inclined front end surfaces 59 of the ribs 57. The inclined portion 73 of plug 70 acts as a cam and forces the ribs 57 to expand the central part of the shank portion 53 as in the previously described embodiment. Passages formed between the strips produced when the shank portion 53 breaks along slots 55 permit the previously isolated chemical agents contained within cavities 51A and 51B to pass therethrough and mix with both tree sap and each other.

The cavities 14 and 34 of the first embodiment and the cavities 51A and 51B of the second embodiment described above are isolated from each other prior to capsule use. Consequently, each of the capsules is able to carry a solid chemical agent in one cavity and a liquid chemical agent in the other cavity, solid chemical agents in both cavities or liquid chemical agents in both cavities. Gel formulations of various viscosities may also be carried by each capsule.

It is to be understood that although the invention has been described in detail with respect to preferred embodiments, nevertheless, various other embodiments and variants are possible which are within the spirit and scope of the present invention, and such embodiments and variants are intended to be covered by the following claims.

What is claimed is:

1. A capsule for insertion into a bore comprising:
   a plastic container having a shank portion with one internal cavity having at least one end opening, said one internal cavity containing therein one chemical agent, and a head element integrally formed with said shank portion;
   a plastic plug for sealingly closing said internal cavity, said plastic plug having an outer external diameter slightly smaller than the end opening of said one internal cavity;
   said plug being insertable into said end opening so as to provide a tight fit between said plug and said end opening; and
   means for defining another internal cavity which is isolated from the one internal cavity, the other internal cavity containing another chemical agent;
   said shank portion having a plurality of recessed slots which are formed in the exterior surface thereof at circumferentially equal spacings, said slots extending longitudinally along a central part of said shank portion between said end opening and said head element and allowing said shank portion to be broken so that as an impact force applied to said head element moves said head element towards said plastic plug, said plastic plug expands said central part of said shank portion and breaks said shank portion along said recessed slots into a plurality of strips to form passages between said strips, thereby allowing said chemical agents to pass from said one internal cavity and said other internal cavity through said passages.

2. A capsule as defined in claim 1, wherein said head element has a plurality of ribs integrally formed therewith.

3. A capsule as defined in claim 2, wherein said ribs extend cross-wise of said head element in a radial direction.

4. A capsule as defined in claim 3, wherein said head element is shaped cylindrically.

5. A capsule as defined in claim 1, and further comprising a plurality of ribs, each having an inclined end surface and extending radially into at least one of the internal cavities from an inner surface of said shank portion, and wherein said plug includes a tapered portion slidable along each inclined end surface to expand the central part of said shank portion.

6. A capsule as defined by claim 1 and further comprising a cap closing an open end of the plug, wherein said means for defining the other internal cavity comprises a cylindrical portion of said plug, said cap and a thin membrane forming a closed end of said plug.

7. A capsule as defined by claim 6, and further comprising a spear integrally formed with said plastic container for piercing said thin membrane as said head element moves toward said plastic plug.

8. A capsule as defined by claim 1, and further comprising circumferentially extending protrusions disposed on an outer surface of said head element.

9. A capsule as defined by claim 1, wherein said means for defining the other internal cavity includes a thin membrane extending within said shank portion and a cap received in an opening formed in said head element.

10. A capsule as defined by claim 9, wherein said thin membrane is integrally formed with said shank portion.

* * * * *